(12) United States Patent
Qureshi et al.

(10) Patent No.: US 10,027,351 B1
(45) Date of Patent: Jul. 17, 2018

(54) VIRTUALIZED HARDWARE SUPPORT FOR MOBILE DEVICES

(71) Applicant: Amazon Technologies, Inc., Seattle, WA (US)

(72) Inventors: Tipu Saleem Qureshi, Seattle, WA (US); Deepak Singh, Issaquah, WA (US); William Andrew Thurston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/963,086

(22) Filed: Dec. 8, 2015

(51) Int. Cl.
*H04B 1/00* (2006.01)

(52) U.S. Cl.
CPC .................. *H04B 1/0003* (2013.01)

(58) Field of Classification Search
CPC .. H04B 1/0003; H01Q 1/246; H04W 52/0258
See application file for complete search history.

(56) References Cited

U.S. PATENT DOCUMENTS

| | | | |
|---|---|---|---|
| 6,594,780 B1 | 7/2003 | Shen et al. | |
| 7,546,595 B1 | 6/2009 | Wickham et al. | |
| 7,849,459 B2 | 12/2010 | Burkhart et al. | |
| 8,171,483 B2 | 5/2012 | Nord et al. | |
| 8,200,634 B2 | 6/2012 | Driesen et al. | |
| 8,473,444 B1 | 6/2013 | McCarten | |
| 9,268,935 B2 * | 2/2016 | Lindo | G06F 21/53 |
| 9,547,564 B1 | 1/2017 | Troutman et al. | |
| 9,692,666 B2 | 6/2017 | Salokanto et al. | |
| 9,886,300 B2 | 2/2018 | Nakatsu | |
| 2008/0071651 A1 | 3/2008 | Markel et al. | |
| 2010/0039325 A1* | 2/2010 | van Rooyen | H01Q 1/246 342/377 |
| 2010/0202560 A1* | 8/2010 | Luo | H04B 7/0691 375/295 |
| 2016/0234785 A1* | 8/2016 | Gupta | H04W 52/0258 |
| 2017/0090897 A1 | 3/2017 | Veereshwara et al. | |

OTHER PUBLICATIONS

ISO/IEC 11889-1:2009 Information technology—Trusted Platform Module—Part 1: Overview.
ISO/IEC 11889-2:2009 Information technology—Trusted Platform Module—Part 2: Design Principles.
ISO/IEC 11889-3:2009 Information technology—Trusted Platform Module—Part 3: Structures.
ISO/IEC 11889-4:2009 Information technology—Trusted Platform Module—Part 4: Commands.

(Continued)

*Primary Examiner* — Myron K Wyche
(74) *Attorney, Agent, or Firm* — Davis Wright Tremaine LLP

(57) ABSTRACT

A mobile device may include a plurality of physical antennas configured to receive and transmit data. The physical antennas may be virtualized to enable efficient access and utilization of the computing resources of the physical antenna. Furthermore, the mobile device may support containerization of application executed by the mobile device. The virtualized physical antennas may be provided to various containers executed by the mobile device. Furthermore, a priority mechanism may be used to manage container access to the physical antennas.

20 Claims, 9 Drawing Sheets

(56) References Cited

OTHER PUBLICATIONS

Trusted Computing Group, "TPM Main, Part 1 Design Principles," Specification Version 1.2, Level 2 Revision 103, Jul. 9, 2007, 182 pages.
Trusted Computing Group, "TPM Main, Part 2 TPM Structures," Specification Version 1.2, Level 2 Revision 103, Jul. 9, 2007, 198 pages.
Trusted Computing Group, "TPM Main, Part 3 Commands," Specification Version 1.2, Level 2 Revision 103, Jul. 9, 2007, 330 pages.
Trusted Computing Group, "TPM Main, Part 1 Design Principles," Specification Version 1.2, Revision 116, Mar. 1, 2011, 184 pages.
Trusted Computing Group, "TPM Main, Part 2 TPM Structures," Specification Version 1.2, Revision 116, Mar. 1, 2011, 201 pages.
Trusted Computing Group, "TPM Main, Part 3 Commands," Specification Version 1.2, Revision 116, Mar. 1, 2011, 339 pages.
Wikipedia, "IEEE 802.11n-2009," retrieved from Wikipedia, the free encyclopedia, on Aug. 31, 2017, 13 pages.
Wikipedia, "IEEE 802.11ac," retrieved from Wikipedia, the free encyclopedia, on Aug. 31, 2017, 11, pages.
Tuovinen, "Reducing Downtime During Software Deployment," dated Aug. 4, 2015, 59 pages.

\* cited by examiner

VIRTUALIZED HARDWARE SUPPORT FOR MOBILE DEVICES

CROSS REFERENCE TO RELATED APPLICATIONS

This application incorporates by reference for all purposes the full disclosure of co-pending U.S. patent application Ser. No. 14/963,097, filed concurrently herewith, entitled "CONTAINER HANDOVER FOR DEVICE UPDATES."

BACKGROUND

The use of network computing and storage has proliferated in recent years. At least a portion of this proliferation may be attributed to virtualization of hardware and software resources providing additional support and flexibility for users of computing resource. The resources for network computing and storage are often provided by computing resource providers who leverage large-scale networks of computers, servers, and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers in part due to the flexibility afforded by virtualization. The usage of virtualized computing resources allows content providers and online merchants, among others, to efficiently and adaptively satisfy their computing needs, whereby the computing and storage resources used by the content providers and online merchants are added or removed from a large pool provided by a computing resource provider as needed and depending on their needs. Additionally mobile devices are quickly outgrowing other form factors and the development of mobile applications is growing and becoming more ambitious. Furthermore, the computing resources available to mobile devices are quickly growing and the capabilities of mobile devices are growing along with this growth.

BRIEF DESCRIPTION OF THE DRAWINGS

Various techniques will be described with reference to the drawings, in which.

DETAILED DESCRIPTION

Figure 1:
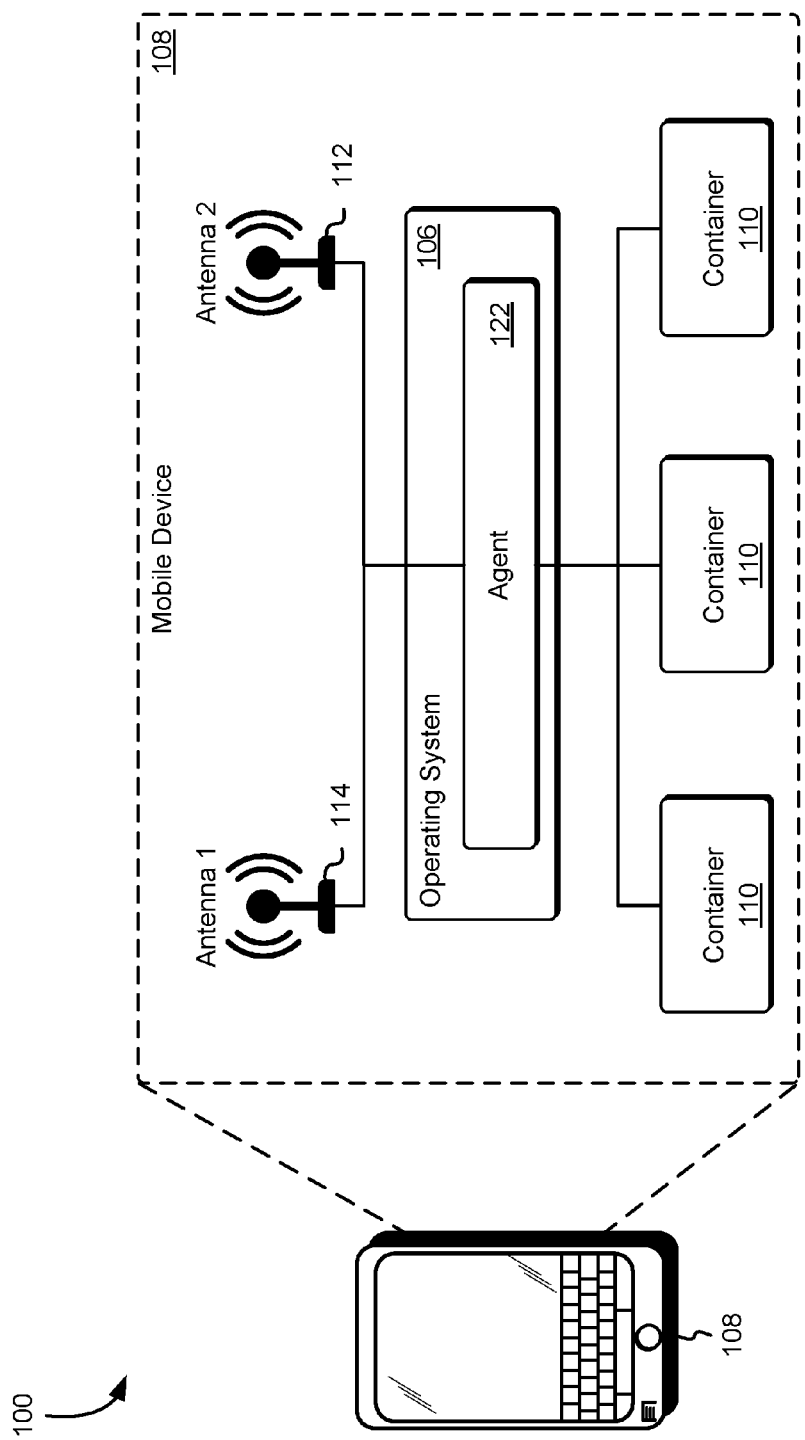
FIG. 1 illustrates an environment in which an agent executed by a mobile device may provide and manage virtualized hardware resources to containers executed by the mobile device in accordance with at least one embodiment.

In various examples described below, physical resources of a mobile device may be virtualized to enable more efficient utilization of the physical resources by various applications and other software executed by the mobile device. In addition, containerization of operating systems and other applications executed by the mobile device further increases efficiency and utilization of the computing resources of the mobile device. In one specific example, a mobile device contains several radio antennas for transmitting and receiving data as well as other operations such as placing phone calls. The physical resources of the radio antennas are virtualized and provided to applications or operating systems of the mobile device. The applications or operating systems of the mobile device may be containers or virtualized software functions. The containers may execute various tasks on behalf of the mobile device. The containers may be virtual machine instances configured to support containerization, and the software functions may be registered or deregistered from the mobile device's operating system to fit the needs of the mobile devices. Each container may contain a container agent, which may be an application configured to, when executed by one or more processors of the mobile device, perform various tasks with containers and applications included in the container, including registering containers, deregistering container, virtualizing hardware resources, splitting virtualized hardware resources, starting tasks, stopping tasks, queuing tasks, providing task statuses, signaling task heartbeats, and reporting task events. Various applications of the mobile device may include data and one or more instructions that, when executed in a container configured to support containerization, may be isolated from other processes running within the mobile device.

An agent executed by the mobile device may manage container access to virtualized hardware resources of the mobile device and may prioritize a queue requests between the various containers of the mobile device. For example, the agent may initialize a container for testing various features and operations of the mobile device's radio antenna. Furthermore, the agent may de-prioritize requests received from the container used for testing to reduce the impact on the computing resource available to one or more other containers utilized by an operator of the mobile device. In such scenarios the containers utilized by the operator of the mobile device may be given higher priority so the operator does not experience a degradation in operation or service of the mobile device. A priority queuing system such as priority rings or other queues with priority may be used to prioritize request between various containers. In addition, other mechanisms to distribute the physical resources using virtualization techniques may be implemented. For example, the containers may be provided with a fixed amount of bandwidth distributed between one or more antennas of the mobile device.

In another example, the agent or container agent utilizes smart interrupts to prioritize the user's container or particular user operations over other containers or operations being performed, such as, automatically deprioritizing testing to a less privileged priority ring. Similarly, the agent may assign 'shares' or a percentage of physical resources between containers and/or applications of the mobile device. For example, the agent or other components of the operating system implemented by the mobile device may swap between 0% and 100% of the share of the virtual antennas assigned to various containers, such as the active user container or a background container. Independent of the mechanism used to split or otherwise divide access to the physical resources of the mobile device, a fairness algorithm for specifying constraints on various types of resources may be utilized. For example, the fairness algorithm may ensure that a background container receives at least some portion of the physical resources to function correctly. In addition, these fairness algorithms may be platform-specific, for example, certain mobile devices may have additional antennas or additional processing capabilities.

In the preceding and following description, various embodiments are described. For purposes of explanation, specific configurations and details are set forth in order to provide a thorough understanding of the embodiments. However, it will also be apparent, to one skilled in the art, that the embodiments may be practiced without the specific details. Furthermore, well-known features may be omitted or simplified in order not to obscure the embodiment being described.

FIG. 1 illustrates an aspect of an environment 100 in which embodiments may be practiced. As illustrated in FIG. 1, the environment 100 may include a user's mobile device 108 that may include a plurality of antennas configured to send receive data and other information. The mobile device 108 may be any suitable computer system, mobile phone, smartphone, tablet, portable computer or combination thereof capable of supporting both physical hardware virtualization and software containerization. Furthermore, the mobile device 108 may include processors, memory, and other physical hardware, described in greater detail below, configured to enable the mobile device 108 to implement an operating system 106, agent 122, and containers 110. In the example illustrated in FIG. 1, the mobile device 108 physical hardware includes 'antenna 1' 114 and 'antenna 2' 112. Each antenna may be the same of different physical hardware. The antennas 114 and 112 may be antennas configured based at least in part on various wireless communication standards including IEEE 802.11n (Wi-Fi)®, IEEE 802.11ac (Wi-Fi)®, HSPA+ (3G), WiMAX (4G), Long Term Evolution (4G), and any other communications systems configured to transmit and receive data. In addition, the antennas 114 and 112 may utilize multiple-input and multiple-output (MIMO) to multiply the capacity of a radio link using multiple transmit and receive antennas to exploit multipath propagation. MIMO specifically refers to a variety of techniques for transmitting and receiving more than one data signal on the same radio channel at the same time via multipath propagation.

Furthermore, the resources of the mobile device 108 may be made available to other users and/or devices through virtualization of the resources and management of the virtualized resources by the agent 122. For example, the mobile device 108 may utilize the containers 110 to provide a virtual operating system or application for users, and these users may then interact with the mobile device 108 through the virtual presence provided through the container 110. The agent 112 may be a component of the operating system 106 configured to manage the containers 110 access to physical resources of the mobile device 108. For example, the agent 122 may be a set of computer instructions or other logic configured to enable the containers 110 to access the antennas 114 and 112 and prioritize access to the resources to particular containers based at least in part on one or more attributes of the containers 110 described in greater detail below. Furthermore, for the purposes of the present disclosure, in various embodiments when the agent 122 includes the set of computer instructions or other logic, performance of an operation by the agent 122 causes the underlying computer system (e.g., the mobile device 108) executing the set of computer instructions or other logic to perform the operation. The agent 122 may also be implemented by specialized hardware or virtualized hardware, such as a processor configured to perform the operations of the agent 122.

The operating system 106 may be any operating system suitable for running within the mobile device 108 and that provide isolation technology that enable containerization schemes to isolate virtualization instances, such as containers 110 or software functions described in greater detail below, from other processes running under the operating system 106. Examples of such operating systems include various implementations of Linux® operating systems that support resource isolation features in the Linux kernel. The isolation technology may include process isolation is which each process (e.g., software function, application, executable code) is prevented from accessing any other process by an operating system. Process isolation may be implemented with virtual address space (e.g., a namespace as described above), where a particular process address space is different from any other processes address space thereby preventing processed from accessing one another. As noted, the software functions and containers 110 may be virtualized instances within the operating systems 106 launched from application images or other data objects in accordance with one or more task definitions, and may be allocated resources of the mobile device from the agent 122.

In some examples, a "container" may refer to a computer system instance (virtual or non-virtual, such as a physical computer system running an operating system) that is configured to launch and run software functions. Thus, the containers 110 may be configured to run the software functions within the mobile device 108 or operating system 106 of the mobile device in accordance with the task definition or other information defining various attributes of the container 110 provided by the mobile device 108 or other entity, such as a software developer or user of the mobile device 108. One or more containers 110 may comprise a cluster or may be otherwise organized to execute one or more operations in concert. In some examples, "cluster" may refer to a set of one or more containers that have been registered with the cluster to be distributed and/or perform various tasks. Thus, the containers 110 may be one of many different containers 110 registered with the cluster, and the other containers 110 of the cluster may be configured to run the same or different types of software functions as the container 110. The containers 110 within the cluster may be of different container types or of the same container type, and the mobile device 108 may have access to or interact with more than one cluster. Thus, the mobile device 108 may launch one or more clusters and then the agent 122 manage user and application isolation of the software functions within each cluster or container through application programming interface (API) calls made to the operating system.

A software function may be a lightweight virtualization instance running under a container that allows processes and data used by the processes within the software function to be isolated from other processes running in the same container or computer systems, such as the mobile device 108. Thus, the software functions may each be virtualization instances running under the operating system of the containers 110 and executing in isolation from each other. Each of the software functions and/or containers may have their own namespace, and applications running within the software functions and/or containers are isolated by only having access to resources available within the container namespace. Thus, software functions may be an effective way to run one or more single applications within their own namespace. A container encapsulation system allows one or more software functions to run within a single operating instance without overhead associated with starting and maintaining virtual machines for running separate user space instances. An example container encapsulation system is the Docker® container engine. For example, an application may consist of several software functions, these software functions may be configured to perform operations on behalf of mobile devices 108. The software functions are executed in one or more containers 110, as described above, using computing resources of the mobile device 108. Software developer may develop applications and software functions based at least in part on computing resources available to containers 110 and the mobile device 108.

The software functions may be launched to have only specified resources from resources allocated to the containers 110; that is, a software function may be launched to have a certain amount of memory and to not utilize more than a specified amount of processing power. This may be managed by the agent 122. The resource allocation for the software functions may be specified in the task definition or determined by the agent 122 based at least in part on attributes of the software functions, containers 110, resources of the mobile device 108, active containers, background containers, user applications and/or user operations, or any other attribute suitable for determining an amount of resources to allocate. Multiple software functions may be running simultaneously on a single container, and the resources of the container may be allocated efficiently between the software functions, other containers 110, and/or clusters of containers. In some embodiments, the mobile device 108 may support running software functions 118 in containers 110 from only one user. In other embodiments, the mobile device 108 may allow multiple users to have containers 110 running on the mobile device 108. In the latter case, the mobile device 108 may provide security to ensure that the users are unable to access containers 110, clusters, or software functions of the other users.

Different types of tasks may have different resource requirements and may have different lifespans. Thus, the software functions may be dynamically scheduled to run by a scheduler service or other component of the agent 122 and/or operating system 106 independent of an underlying operating system of the containers 110, and as such, the underlying operating system of the containers 110 may be very basic. Alternatively, the containers 110 may be scheduled to run by a scheduler installed within the containers.

Figure 2:
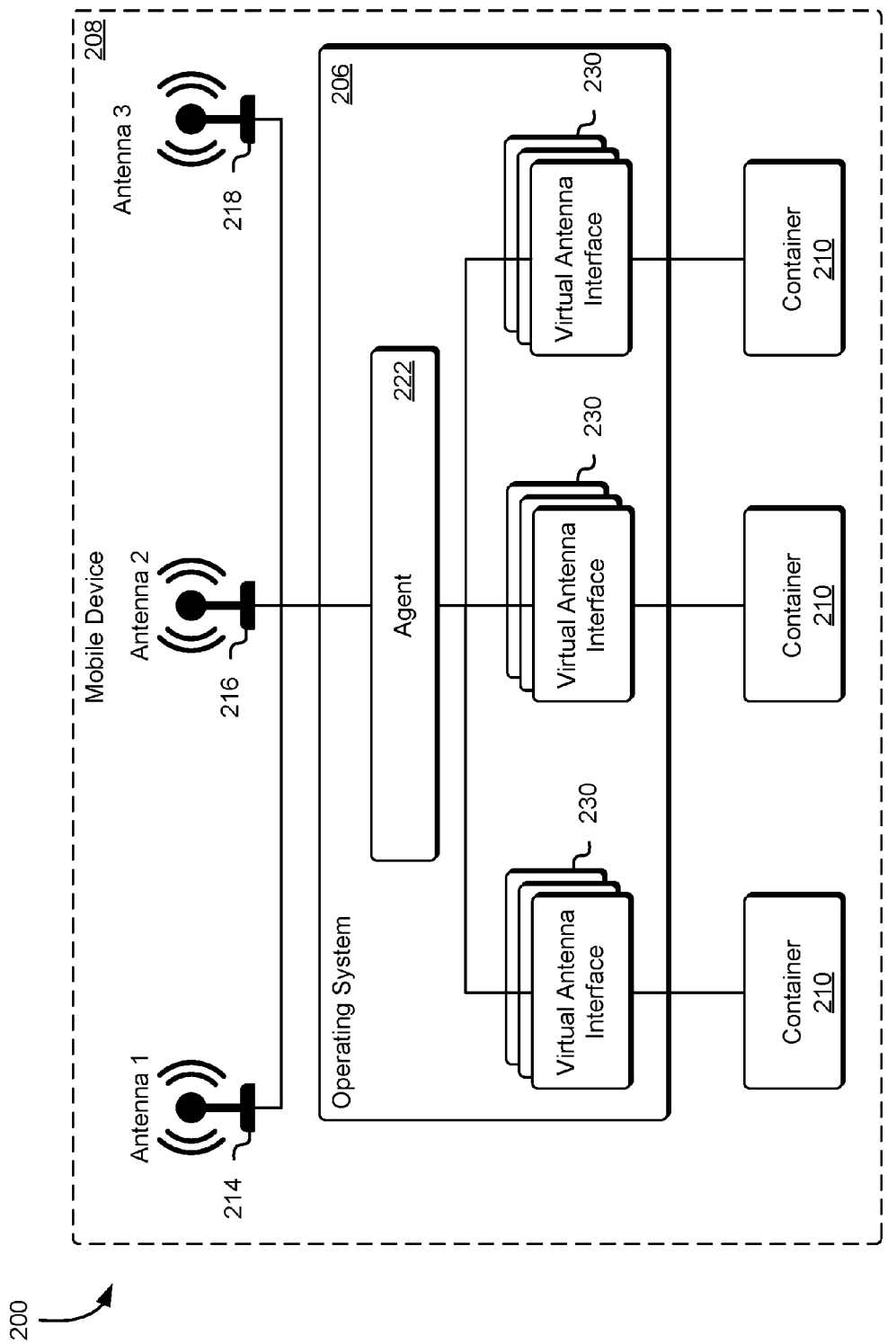
FIG. 2 illustrates an environment in which an agent executed by a mobile device may provide and manage virtualized hardware resources to containers executed by the mobile device in accordance with at least one embodiment.

FIG. 2 illustrates an aspect of an environment 200 in which embodiments may be practiced. As illustrated in FIG. 2, the environment 200 may include a user's mobile device 208 that may include a plurality of antennas configured to send and receive data and other information. The mobile device 208 may be any suitable computer system, mobile phone, smartphone, tablet, portable computer or combination thereof capable of supporting both physical hardware virtualization and software containerization. Furthermore, the mobile device 208 may include processors, memory, and other physical hardware, described in greater detail below, configured to enable the mobile device 208 to implement an operating system 206, agent 222, and containers 210.

The antennas illustrated in FIG. 2 may include a variety of different antennas such as IEEE 802.11n (Wi-Fi)® antennas, IEEE 802.11ac (Wi-Fi)® antennas, HSPA+ (3G) antennas, WiMAX (4G) antennas, Long Term Evolution (4G) antennas, near field communications (NFC) antennas, and any other antenna systems configured to transmit and receive data. Furthermore, the virtual antenna interfaces 230, described in greater detail below, provided to the containers 210 may be same or similar regardless of the type of antennas included in the mobile device 208. In this way, the containers 210 may be provided with a uniformed interface for accessing physical antenna resources of the mobile device 208 and the agent 222 may be responsible for communication and utilization of the various different antennas and antenna protocols associated with the different antenna types contained within the mobile device 208. For example, the container 210 may transmit a request, through the virtual antenna interface 230, to send a 2 megabyte (Mb) file. The agent 222 may determine an amount of bandwidth of one or more antennas to assign to the container 210 to process the request. For example, the agent 222 may assign the container 210 1 Mb of 4G bandwidth and 1 Mb of Wi-Fi bandwidth to send the 2 Mb file. In addition, the agent 222 may determine certain antennas may not be suitable for processing requests from the containers 210. For example, an NFC antenna may not have access to the Internet and therefore may not be suitable for processing requests that require data to be transmitted or received from the Internet.

Additionally, the agent 222 may provide one or more virtual antenna interfaces 230 to the containers 210. The virtual antenna interfaces 230 may enable to the containers 210 to interact with the antennas of the mobile device 208. For example, the agent 222 may provide three virtual antenna interfaces 230, one for each of 'antenna 1' 214, 'antenna 2' 216, and 'antenna 3' 218. Alternatively, the agent 222 may provide a single virtual antenna interface 230 to the containers 210 to interact with all three antennas 214, 216, and 218 of the mobile device 208. In such scenarios, the agent may manage utilization of the antennas by the containers 210 through the virtual antenna interfaces 230. For example, the agent 222 may divide traffic, from the container 210, directed to a single virtual antenna interface 230 to a particular antenna associated with the virtual antenna interface 230 based on a variety of factors, such as a type of traffic or amount of traffic. The agent 222 may also direct and/or divide the traffic received at the virtual between antenna interface 230 between the various physical antennas of the mobile device 208. For example, to increase bandwidth of a particular container, the agent may distribute traffic transmitted from the particular container to the virtual antenna interface 230 to all of the physical antennas of the mobile device 208.

In the example illustrated in FIG. 2, each physical antenna of the mobile device 208 is associated with a virtual antenna interface 230 provided to the containers 210. Specifically, the mobile device 208, in the example illustrated in FIG. 2, contains 3 antennas, each container 210 is provided with a single virtual antenna interface 230 for each antenna of the mobile device 208. As illustrated in FIG. 2, there are 3 antennas and 3 containers for a total of 9 virtual antenna interfaces distributed evenly between the containers 210, one virtual antenna interface per physical antenna of the mobile device 208. The virtual antenna interfaces 230 may operate as virtual device drivers exposed to the containers 210. Exposing the virtual antenna interfaces 230 may include various mechanisms for allowing the containers 210 to access the physical resources as described herein. For example, the agent 222 may expose a virtual device driver to the container 210. In another example, the agent 222 may enable direct access to the physical antennas. Virtual device drivers may represent a particular variant of device drivers and may be used to emulate a hardware device, particularly in virtualization environments, such as a radio antenna as depicted in FIG. 2. The containers 210 may have access to other virtual device drivers, for example, virtual disk driver or virtual processors. In yet other embodiments, the containers are supported by a bare metal hypervisor and have direct access to the underlying hardware of the mobile device 208.

In various embodiments, the virtual antenna interfaces 230, instead of enabling the containers to communicate with physical hardware of the mobile device 208, the virtual antenna interfaces 230 emulate the radio antennas, so that the containers and the drivers and/or other executable code implemented within the containers 210 has the appearance of accessing actual physical hardware of the mobile device 208. However, attempts by the containers 210 to access the physical hardware of the mobile device 208 are routed to the virtual antenna interface 230 or other virtual device driver in the operating system 206 as function calls and/or API calls. The virtual device drivers may also transmit simulated processor-level events like interrupts into the containers 210. Smart interrupts, as described above, may include interrupts that prioritize an active user session associated with a particular container over various back ground operations. In additions smart interrupts may include the use of CPU 'shares,' as described above, where the operating system may swap between 0% and 100% of the share of resources assigned to respective (i.e., active vs. background) containers 210.

Additionally, the agent 222 may be responsible for initialization and management of the virtual antenna interfaces 230 and other virtual device drivers exposed to the containers 210. Various containers 210 may have access to different or the same virtual device drivers. For example, a particular container may only be provided access to a single antenna of the mobile device 230 through a single virtual antenna interface 230. There may be a variety of reasons for only providing the particular container with access to certain antennas, such as for testing or debugging purposes, or the container only needs access to local network to function properly, or container does not need to place phone calls and can send and receive all necessary data over a Wi-Fi® connection, or any other suitable reason for limiting a container's access to the physical resources of the mobile device 210.

Figure 3:
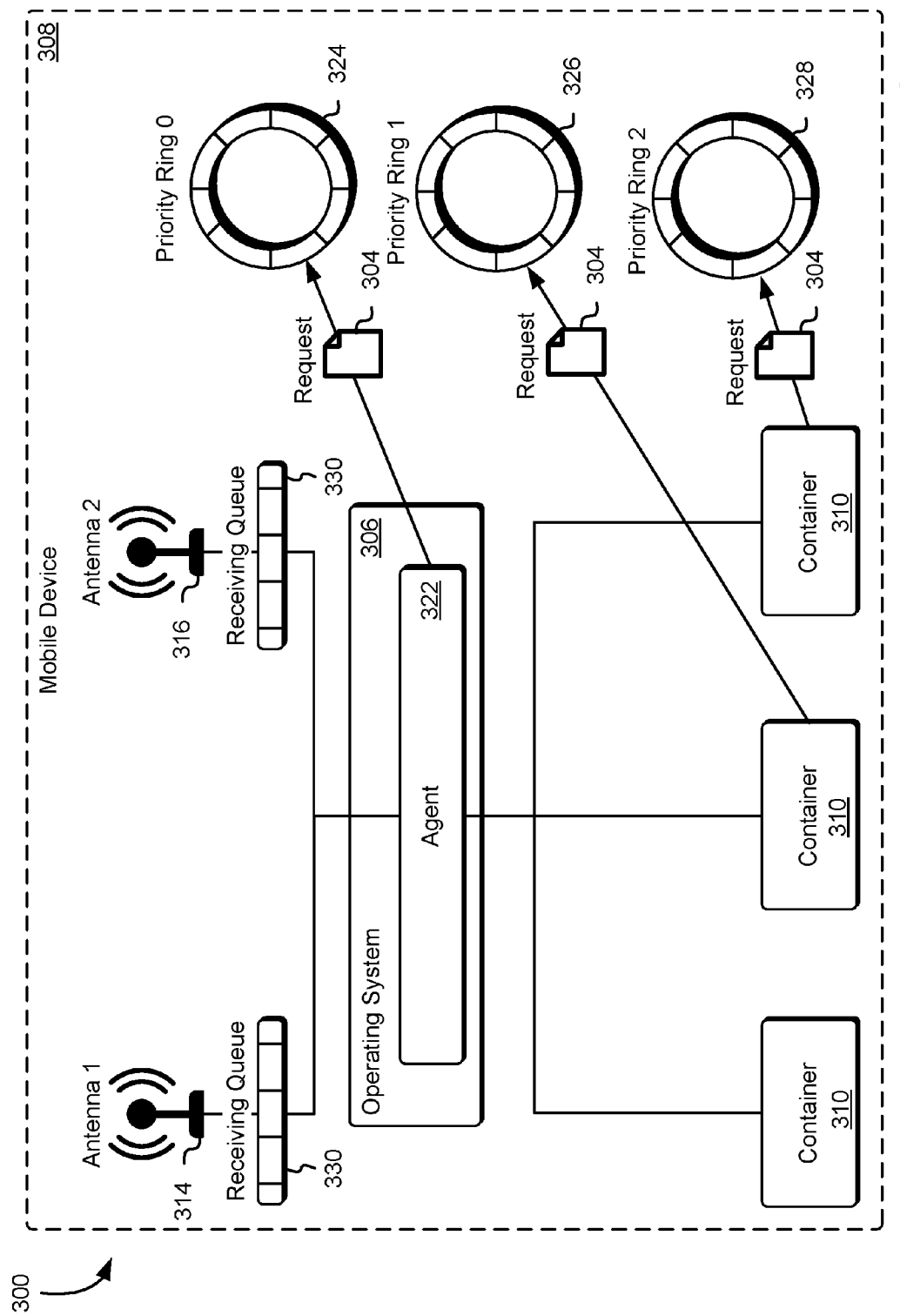
FIG. 3 illustrates an environment in which an agent executed by a mobile device may provide and manage virtualized hardware resources to containers executed by the mobile device in accordance with at least one embodiment.

FIG. 3 illustrates an aspect of an environment 300 in which embodiments may be practiced. As illustrated in FIG. 3, the environment 300 may include a user's mobile device 308 that may include a plurality of antennas configured to send and receive data and other information. The mobile device 308 may be any suitable computer system, mobile phone, smartphone, tablet, portable computer or combination thereof capable of supporting both physical hardware virtualization and software containerization. Furthermore, the mobile device 308 may include processors, memory, and other physical hardware, described in greater detail below, configured to enable the mobile device 308 to implement an operating system 306, agent 322, and containers 310. In addition, the antennas of the mobile device 308 may include one or more receiving queues 330 for processing, storing, and providing received data and other information to the containers 310, operations system 306, agent 322, and other applications executed by the mobile device 308. Each antenna, such as 'antenna 1' 314 and 'antenna 2' 316 may have an individual receiving queue 330 or one or more antennas of the mobile device 308 may share a single receiving queue 330. The receiving queue 330 may be large enough to accommodate a large number of containers 310 with a low priority.

As illustrated in FIG. 3, the agent 322 may manage priority rings and/or priority queuing mechanisms. In the example, illustrated in FIG. 2, the agent 322 manages priority ring zero 324, priority ring one 326, and priority ring two 328. Priority ring zero 324 may have the highest priority and requests 304 placed in priority ring zero 324 may be processed before requests 304 placed in priority ring one 326 and/or priority ring two 328. Similarly, requests 304 placed in priority ring one 326 may be processed before requests 304 placed in priority ring two 328. In various embodiments, all requests 304 from a higher priority ring (e.g., lower ring number) are processed before any request from a lower priority ring. For example, all requests 304 place in priority ring zero 324 are processed before any requests 304 placed in priority ring one 326 or priority ring two 328. A priority queue or priority ring may be an abstract data type which may operate as a regular queue or stack data structure, but where additionally each element (e.g., queued request) has a 'priority' associated with it. In a priority queue or priority ring, a request with higher priority is served (e.g., processed) before an element with lower priority. If two or more requests have the same priority, they may be processed according to their order in the queue (e.g., a time each request was received and queued). The priority queues or priority rings may be implemented as one or more heaps, lists, maps, linked lists, unordered arrays, or any other suitable data structure for queuing requests with an associated priority.

The priority rings may have various queue sizes and may be configured to accommodate a large number of requests. For example, because priority ring two 328 has the lowest priority, requests 304 in priority ring two 328 may remain queued for a substantial amount of time relative to requests 304 in priority ring one 326 and priority ring zero 324. Therefore, priority ring two may have a large queue depth in order to avoid dropping or otherwise losing requests 304 as a result of the queue associated with priority ring two 328 being full. In addition, the queue size of the priority rings may be dynamically modified to enable more efficient memory utilization.

As described herein, various priority queuing mechanisms may be used by the agents 322 or other component of the operating system to manage limited resources of the mobile device 308, such as, bandwidth of the antennas. In the event of outgoing traffic queuing due to insufficient bandwidth, all other queues (e.g., priority ring one 326 and priority ring two 328) may be halted to send the traffic from the highest priority queue (e.g., priority ring zero 324) upon arrival. This may ensure that the prioritized traffic and/or user traffic (such as real-time traffic, e.g. a data stream of a VoIP connection or telephony connection) is forwarded with the least delay and the least likelihood of being rejected due to a queue reaching its maximum capacity. All other traffic may be handled when the highest priority queue (e.g., priority ring zero) is empty. Alternatively, in some embodiments a disproportionate amount of requests 304 from higher priority queues (e.g., priority ring zero 324 and priority ring one 326) are processed relative to the lower priority requests (e.g., priority ring one 326 and priority ring two 328).

The requests 304 may be a request to transmit data over a network through the antennas. Furthermore, the requests 304 may include other requests to access the physical resources of the mobile device 308. The requests 304 may be provided to a virtual device driver, such as, the virtual antenna interface described above in connection with FIG. 2. The agent 322 may assign a priority level to each container 310. For example, the agent may assign an active user session to priority ring one 326 so that other containers 310 such as an update container, testing container, or debug container do not interfere with the user's operation of the mobile device 308. The agent 322 may be assigned, by the operating system 306, the highest priority (e.g., priority ring zero 324) so that management of the antennas and containers 310 is not delayed or interfered with. Requests 304 from the agent 322 may be transmitted directly to the physical hardware of the mobile device 308 or may be process through a virtual device driver exposed to the agent 322.

Once a priority level has been assigned to a container, all requests 304 from that container may be directed to the appropriate priority queue or priority ring. The agent 322 may modify or otherwise change a priority level associated with a particular container. Furthermore, although as illustrated in FIG. 3, the requests 304 transmitted by the containers 310 are provided directly to the associated priority queue or priority ring, the requests 304 may be first received by the agent 322 other component of the operating system 306 (e.g., virtual device driver or virtual antenna interface) and then provided to the associated priority ring. In this manner the agent may dynamically determine a priority level for each requests 304 regardless of which container 310 may have provided the request.

Additionally, particular applications or executable instructions implemented and/or executing within a particular namespace (e.g., a particular container or particular operating system) may have assigned or have been provided with a different priority level than the namespace under which the application is executing. For example, a particular container may be assigned to priority ring two 328, however a particular application, such as an user application, may be assigned to priority ring one 326 such that all requests transmitted by the containers are queued in priority ring two 328 while all requests transmitted by the particular application, despite being transmitted from the container, are queued in priority ring one 326. In some embodiments, requests 304 may be latched or otherwise associated such that the execution of one request cause the execution of one or more latched requests. For example, the processing, by the mobile device 308 or component thereof such as a processor, of a request in priority ring one 326 may cause a set of associated requests in priority ring two 328 to be processed and/or re-prioritized for quicker processing.

Although the use of priority rings and priority queues is illustrated in FIG. 3, other mechanisms for dividing the physical resources of the mobile device 308 may be used in accordance with the various embodiments described herein. For example, the agent 322 or operating system 306 may split the physical resources of the mobile device 308 between containers 310 based at least in part on a time division mechanism. In such embodiments, the agent divides container access to the physical resources of the mobile device 308 based at least in part on a 'share' of time allotted to each container or other application or executable code executed by the mobile device. For example, the agent 322 may allocate 60% of the physical resources time (e.g., time used for processing requests 304) to the operating system 306, 30% of the physical resources time to an active user container, and the remaining 10% of the physical resources time to an update container. In another example, the agent 322 may divide the physical resource based at least in part on a bandwidth of the physical resource or other performance metrics. In various embodiments, the agent 322 determines a total amount of bandwidth available to the mobile device 308 from one or more antennas of the mobile device 308 and splits the container's 310 access to the antennas based at least in part on a measure of bandwidth to provide each container. For example, a first container may be provided access to 256 kilobytes per second (Kbps) out of a total of 1 megabyte per second Mbps of total bandwidth available to the mobile device 308.

Figure 4:
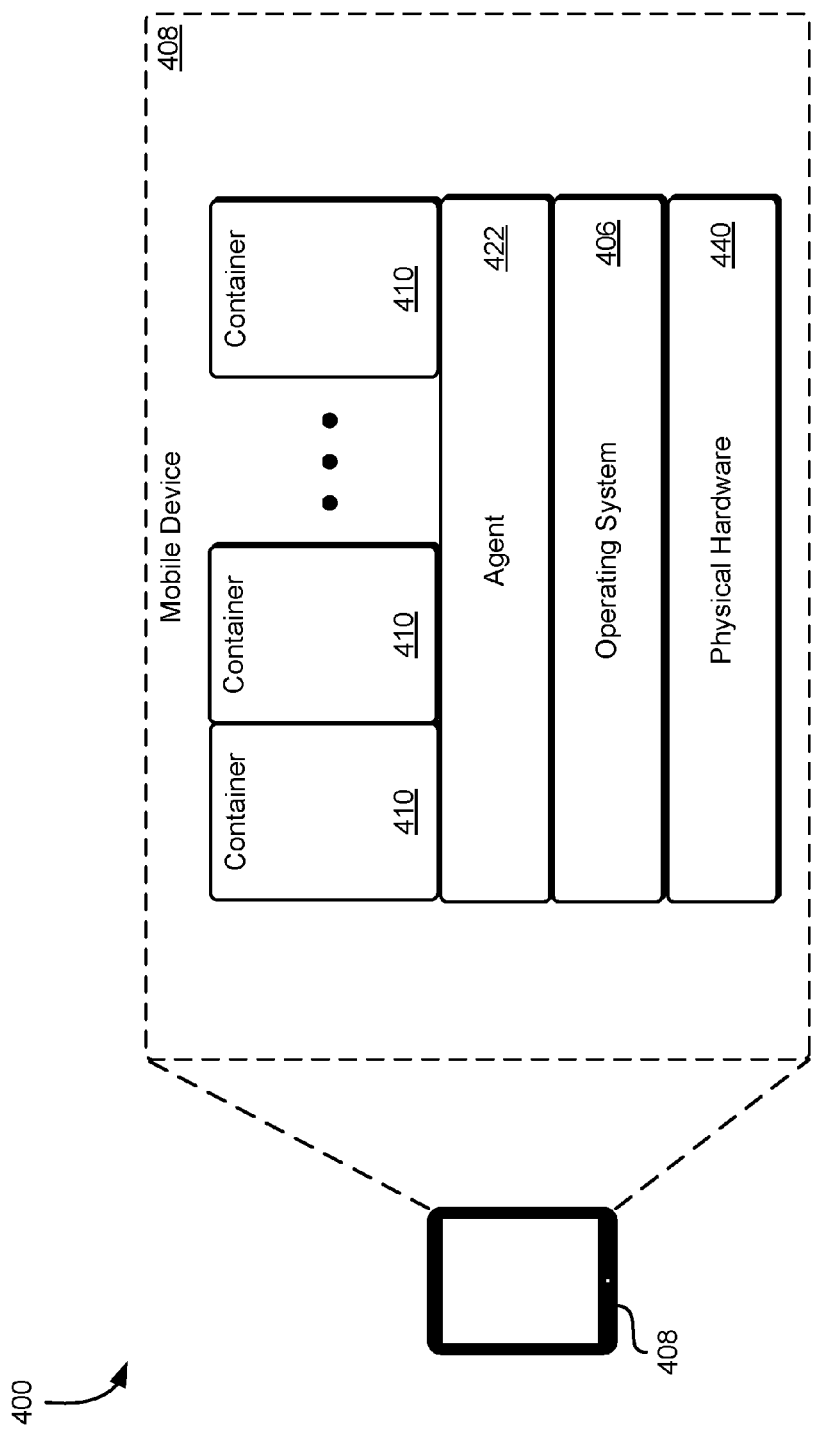
FIG. 4 illustrates an environment in which an agent executed by a mobile device may support containers executed by the mobile device in accordance with at least one embodiment.

FIG. 4 illustrates an aspect of an environment 400 in which embodiments may be practiced. As illustrated in FIG. 4, the environment 400 may include a user's mobile device 408 that may include physical resources configured to support the execution of various application and other software implemented on the mobile device 408. The mobile device 408 may be any suitable computer system, mobile phone, smartphone, tablet, portable computer or combination thereof capable of supporting both physical hardware virtualization and software containerization. Furthermore, the physical resources 440 of the mobile device 408 may include processors, memory, antennas, sensors, and other physical hardware, described in greater detail below, configured to enable the mobile device 408 to implement an operating system 406, agent 422, and containers 410.

The operating systems 406 may be any operating systems suitable for running within the containers 410 and/or for supporting the execution of the containers 410. The operating system 406 may provide isolation technology that enable containerization schemes to isolate virtualization instances, such as the containers 410, from other processes running under the operating system 406. Examples of such operating systems include various implementations of Linux operating systems that support resource isolation features in the Linux kernel. As noted, the container 410 may be virtualized instances within the operating systems 406 launched from application images in accordance with one or more task definitions, and may be allocated resources from the mobile device 408 by the agent 422.

The agent 422 may be a component of the operating system 406 or may be, as illustrated in FIG. 4, an application or other software separate and/or isolated from the operating system 406. The agent 422 may, as described above, manage and enable container access to the physical hardware 440 of the mobile device 408. For example, the agent 422 may, using API calls provided by the operating system 406, provide the containers 410 with virtual device drivers, physical resource state information, images of software applications, access to physical hardware 440, or other functions suitable for supporting one or more containers 410. The container 410 may include an additional operating system or other executable code configured to provide support for the operation of the containers 410.

Figure 5:
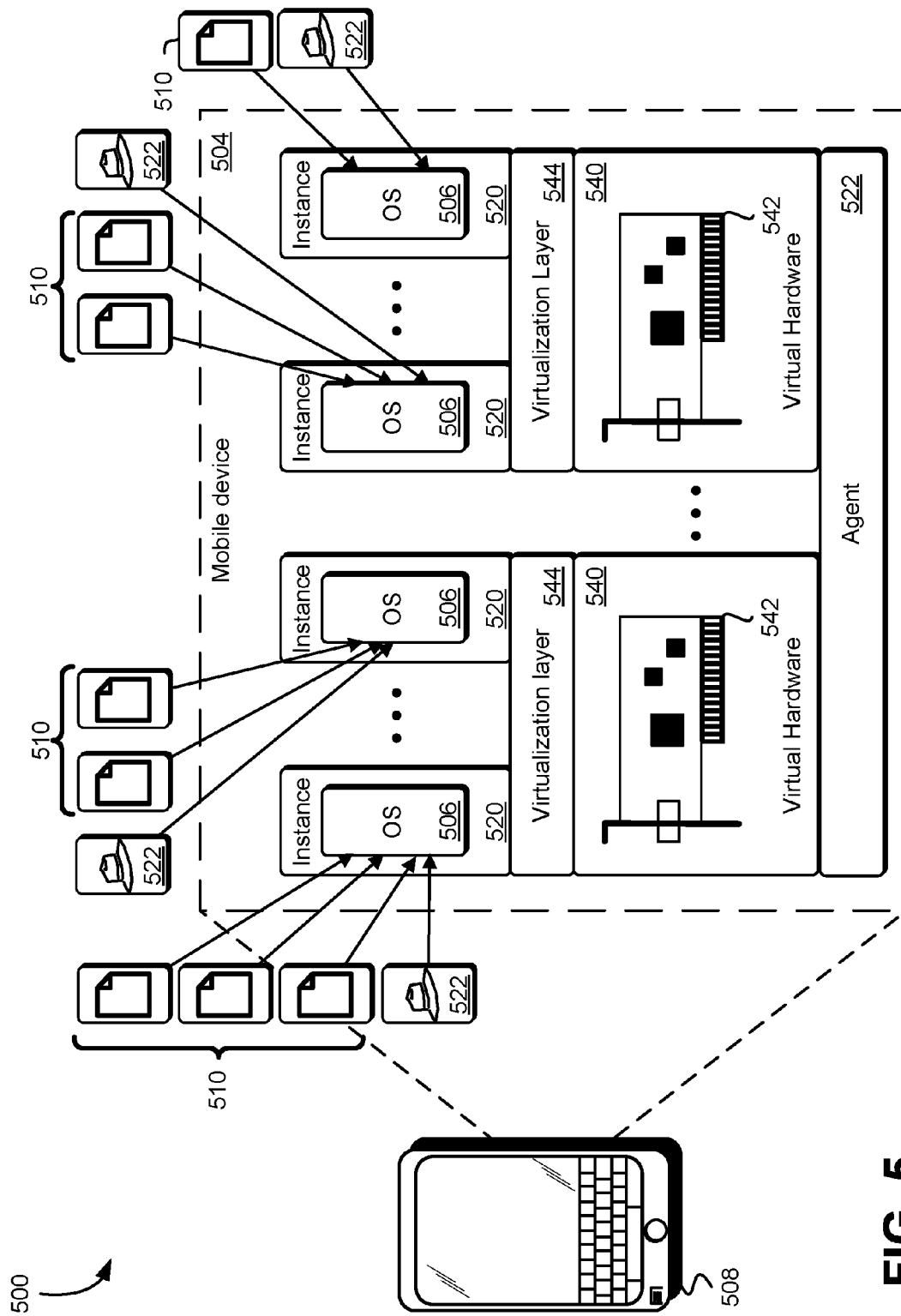
FIG. 5 illustrates an environment in which an agent executed by a mobile device may provide and manage virtualized hardware resources to containers executed by the mobile device in accordance with at least one embodiment.

FIG. 5 illustrates an aspect of an environment 500 in which embodiments may be practiced. Specifically, FIG. 5 depicts a mobile device 508, as described below in connection with FIG. 8, executing a plurality of virtual instances configured as containers 410 in accordance with at least one embodiment. The mobile device 508 may provide system hardware 440 to the containers 510 through virtualized hardware 542 and a virtualization layer 544. The virtualized hardware 542, which may include a virtual hardware interface or virtual device driver, may be configured to enable containers 510 and components thereof such as an operating system 506 or software function 520 to utilize the system hardware 440. The mobile device 508 may be equipped with any needed processing capability including one or more processors, such as a central processing unit, a graphics processing unit, or a digital signal processor. The mobile device 508 may also be equipped with memory (e.g., static and dynamic memory), buses, and input and output ports that are compliant with any handshaking, communications or data transfer protocol. The system hardware 440 may also include storage devices, such as storage disks and tapes, antennas, and networking equipment.

Virtualization layers 544, which in various embodiments may include an agent 522, in connection with the system hardware 540 enable the system hardware 540 to be used to provide computational resources and other resources (e.g., antenna resources) upon which one or more containers 510 may operate and use to execute software functions 520 and other tasks. The virtualization layer 544 may be any device, software, or firmware used for providing a virtual computing resource platform for the containers 510. The virtualization layers 544 executing on the mobile device 508 enable the set of system hardware 540 to be used to provide computational resources necessary to support the containers 510. Furthermore, the mobile device 508 may host multiple virtualization layers of the same or different types on the same system hardware 540 (e.g., multiple agents 522). Each container 510 may include various virtual computer components, such as one or more virtual processors, virtual memory, virtual antenna interfaces, other virtual devices, and virtual storage.

The containers 510 may be initialized by the agent 522 or an operating system executed by the mobile device 508 and the containers 510 may run an operating system 506 and applications (e.g., software functions 520) on each of the containers 510. The containers 510 may also be initialized in response to a command received from a user of the mobile device 508. For example, the user may select a particular application through an interface of the mobile device 508, such as a touchscreen or keyboard, and as a result the agent 522 to cause a container 510 with a particular operating system 506 and software functions 520 to be initialized. The containers 510 may also include an agent 522 to enable management and access to system hardware 540, such as an antenna as described above. An example of a virtualization layer 544 includes a hypervisor.

Requests may be received by a request interface (not illustrated in FIG. 5 for simplicity), such as the virtual antenna interface 230 of FIG. 2 operated by the agent 522. The request interface may direct the request to the appropriate component of system hardware 540 or appropriate priority ring or queue as described above. Each container 510 may include one or more agents 522. The agents 522 may be configured to allow the mobile device 408 (e.g., system hardware 540, user of the mobile device, agent 522, or other containers 510) to manage and interact with software functions 520 and the container 510. The agents 522 may be further configured to perform logging of events and gather telemetry data related to the software functions 520 and containers 510. For example, to determine which software functions 520 are included in an active user session to determine a priority to assign to the container 510. In another example, this information may be used to determine if an update to an operating system or software function 520 of the container executed successfully. Examples of such agents 522 are described in greater detail above.

The operating systems 506 may be any operating systems suitable for running within the containers 510 and that provide isolation technology that enable containerization schemes to isolate virtualization instances, such as the software functions 520, from other processes running under the operating system 506. As noted, the software functions 520 may be virtualized instances within the operating systems 506 launched from application images in accordance with one or more task definitions, and may be allocated resources from their respective containers 510.

Figure 6:
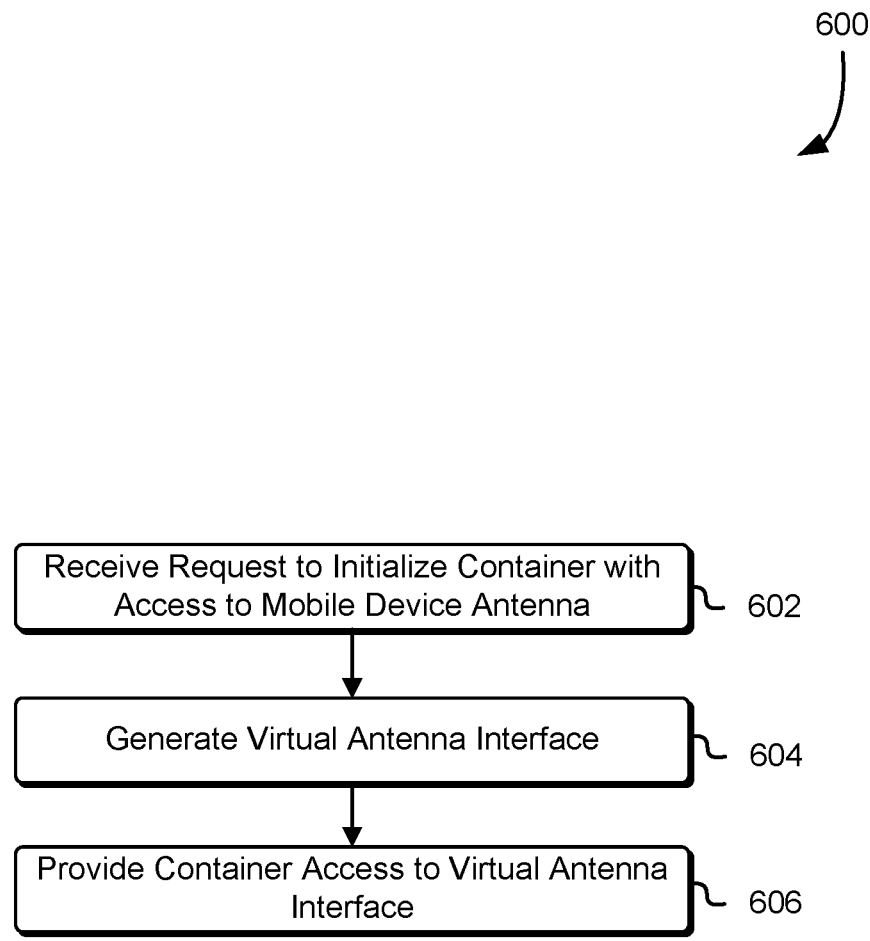
FIG. 6 is an illustrative example of a process for providing virtualized hardware resources to a container in accordance with at least one embodiment.

FIG. 6 shows an illustrative process 600 which may be used to provide containers executing on a mobile device with access to physical antennas of the mobile device through virtual antenna interfaces in accordance with at least one embodiment. The process 600 may be performed by any suitable system such as an agent described above in FIGS. 1-5 or any combination of systems or components thereof such as an operating system as described above. Returning to FIG. 6, in an embodiment, the process 600 includes receiving a request to initialize a container with access to one or more antennas of the mobile device 602. The request may be received as a result of various actions or operations. For example, the request may be received as a result of an operation of a user of the mobile device, such as selecting an application through an interface of the mobile device. In another example, the request is a result of a service provider pushing an update to an application to the mobile device. The request may include a particular antenna or type of antenna to provide the container access with. Alternatively, the request may indicate to provider the container with access to all of the physical resources of the mobile device.

The request may be received at the agent or other component of the mobile device (e.g., the operating system) and directed to the agent for processing. The agent may then generate a virtual antenna interface 604. The virtual antenna interface may include multiple interfaces or a single interface configured to enable the container to transmit and receive data from one or more antennas of the mobile device. For example, the agent may generate a virtual antenna interface for each antenna of the mobile device. Generating the virtual antenna interface may include loading virtual device drivers into memory or other suitable location within the mobile device so that the container may communicate with the virtual device drives (e.g., the virtual antenna interface). The agent may then provide the virtual antenna interface to the container 606. Providing the virtual antenna interface may include causing an operating system of the container to load virtual device driver associated with the virtual antenna interface. As an example, the agent may operate as a hypervisor providing the container with access to the underlying physical resources of the mobile device.

Figure 7:
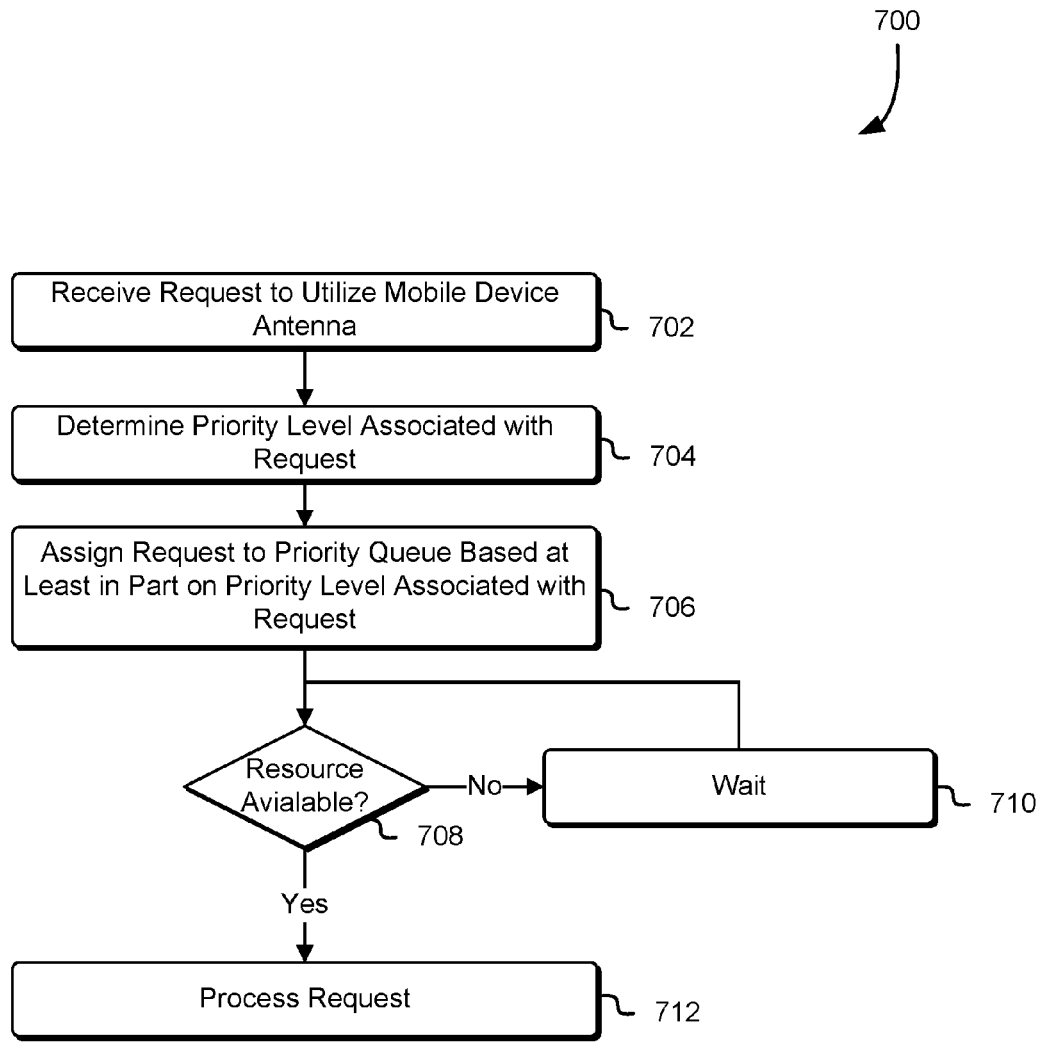
FIG. 7 is an illustrative example of a process for utilizing virtualized hardware resources by a container in accordance with at least one embodiment.

FIG. 7 shows an illustrative process 700 which may be used to process requests transmitted from one or more containers and/or software functions executing within the containers in accordance with at least one embodiment. The process 700 may be performed by any suitable system such as an agent described above in FIG. 3 or any combination of systems or components thereof such as an operating system as described above. Returning to FIG. 7, in an embodiment, the process 700 includes receiving a request to utilize resources of a mobile device antenna. The request may indicate a particular antenna or set of antenna, it may include an operation to be performed, an amount of data to be transmitted, an application associated with the request, a container associated with the request, a user associated with the request, a type associated with the request, an operating system associated with the request, a priority associated with the request, or any other information for determining a priority for processing the request.

The request may be received at a virtual antenna interface and may be provided to an agent of the mobile device by the virtual antenna interface. The agent may then determine a priority level associated with the request 704. The priority level may be determined by the agent at initialization of the container or software function providing the request or may be determined dynamically as requests are obtained by the agent. The priority level may be determined based at least in part on a variety of factors including a user responsible for providing the request, an automated entity (e.g., software functions or other executable code performing an action independent of a human user's input) responsible for providing the request, a probability that processing the request may cause a degradation and/or reduction in an amount of computing resources of the mobile device available to the user, or any other information suitable for determining a priority level of the request. As described above, the priority level may be associated with a priority ring or priority queue which enables requests with a higher priority to be processed prior to other requests which may have a lower priority level.

The agent may then assign the request to a priority queue based at least in part on the priority level associated with the request 706. As described above, a particular request may be placed in the queue associated with the assigned priority level. The agent or other component of the mobile device processing request may then determine the request with the current highest priority. The request with the current highest priority may be the request that is in the highest priority level queue that is yet to be processed (e.g., the requests that have been in the highest priority quest for the longest duration of time). If the request is the highest priority 708, then the request may be processed 712. However, if the request is the highest priority 708, then the request may wait 710 in the queue until there are no other requests in the priority queues with a higher priority that have yet to be processed. Processing the request may include transmitting data over a network through the antennas of the mobile device. In another example, the request may include testing a functionality of the antenna and/or the container responsible for providing the request.

Figure 8:
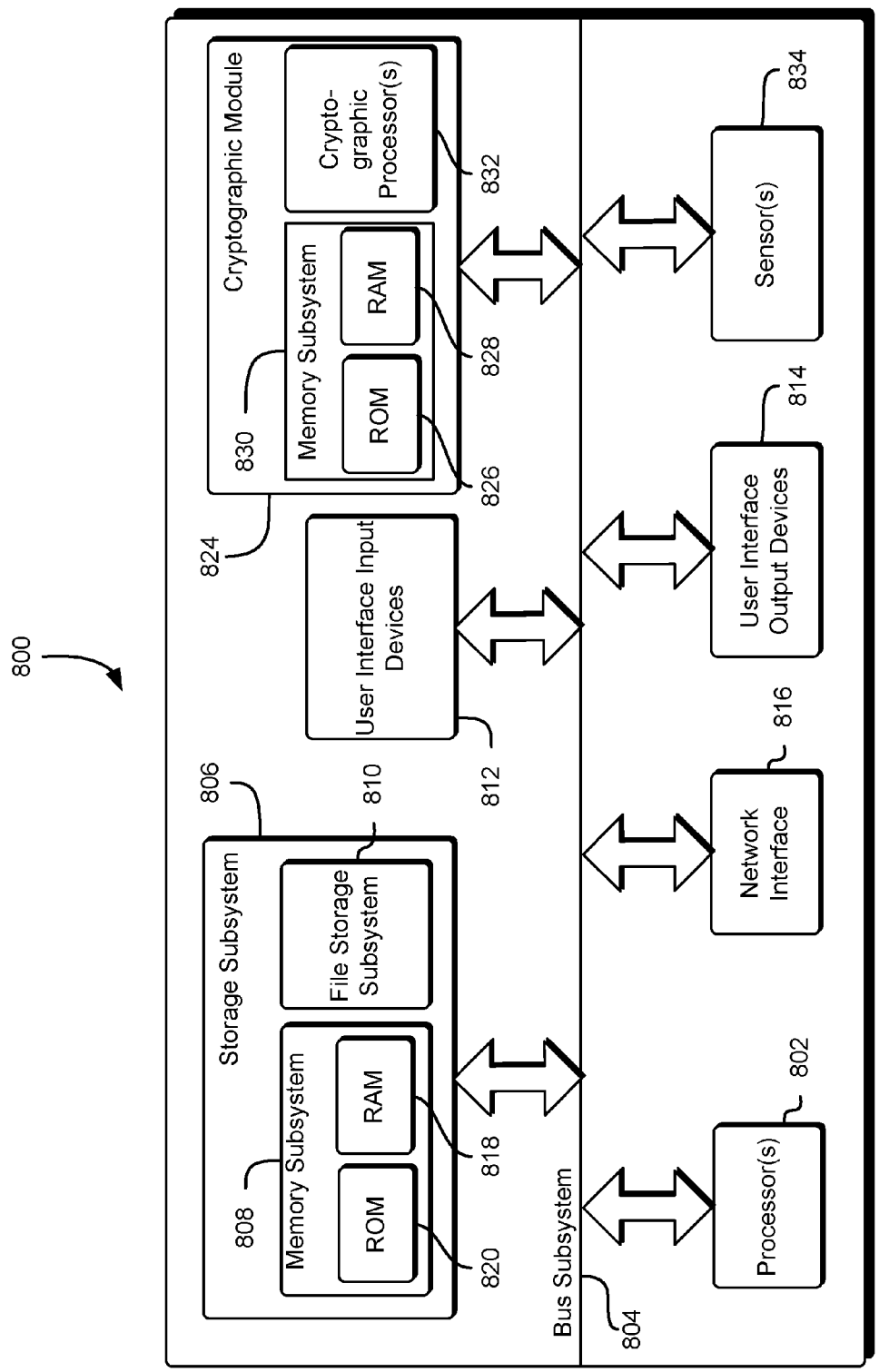
FIG. 8 shows an illustrative example of components of a computing device in accordance with at least one embodiment.

FIG. 8 is an illustrative, simplified block diagram of an example device 800 that may be used to practice at least one embodiment of the present disclosure. In various embodiments, the device 800 may be used to implement any of the systems illustrated herein and described above. For example, the device 800 may be used to implement a mobile device and other applications, such as a container or software function, in accordance with various embodiments. As shown in FIG. 8, the device 800 may include one or more processors 802 that may be configured to communicate with and are operatively coupled to a number of peripheral subsystems via a bus subsystem 804. These peripheral subsystems may include a storage subsystem 806, comprising a memory subsystem 808 and a file storage subsystem 810, one or more user interface input devices 812, one or more user interface output devices 814, a network interface subsystem 816, a cryptographic module 824, comprising a memory subsystem 830, and one or more cryptographic processors 832. The peripheral subsystems may also include one or more sensors 834 in addition to sensors of input devices 812. Such sensors may include, but are not limited to, GPS sensors, accelerometers, temperature sensors, and others.

The bus subsystem 804 may provide a mechanism for enabling the various components and subsystems of device system 800 to communicate with each other as intended. Although the bus subsystem 804 is shown schematically as a single bus, alternative embodiments of the bus subsystem may utilize multiple busses.

The network interface subsystem 816 may provide an interface to other device systems and networks. The network interface subsystem 816 may serve as an interface for receiving data from and transmitting data to other systems from the device system 800. For example, the network interface subsystem 816 may enable transmission of application data and other information, such as electronic requests to access a system (e.g., receive a webpage) and may enable receipt of responses to the requests, such as webpages or other information. The network interface subsystem 816 may also facilitate the receipt and/or transmission of data on other networks, such as an organization's intranet and/or other networks described below. The network interface 816 may include a plurality of antennas such as IEEE 802.11n (Wi-Fi)®, IEEE 802.11ac (Wi-Fi)®, HSPA+ (3G), WiMAX (4G), Long Term Evolution (4G), near field communications (NFC), and any other antenna systems configured to transmit and receive data.

The user interface input devices 812 may include one or more buttons, a keyboard, keypad, pointing devices, such as an integrated mouse, touchpad, or graphics tablet, a scanner, a barcode scanner, a fingerprint scanner, a retinal scanner, a touchscreen incorporated into a display, audio input devices, such as voice recognition systems, microphones, fingerprint readers, retinal scanners and other types of input devices. Further, in some embodiments, input devices may include devices usable to obtain information from other devices, such as long-term or short-term credentials for use in consuming applications, as described above. Input devices may include, for instance, magnetic or other card readers, one or more USB interfaces, near field communications (NFC) devices/interfaces and other devices/interfaces usable to obtain data from other devices. In general, use of the term "input device" is intended to include all possible types of devices and mechanisms for inputting information to the device system 800.

User interface output devices 814, if any, may include a display subsystem, or non-visual displays, such as audio and/or tactile output devices, etc. Generally, the output devices 814 may invoke one or more of any of the five senses of a user. The display subsystem may be a flat-panel device, such as a liquid crystal display (LCD), light emitting diode (LED) display, or a projection or other display device. In general, use of the term "output device" is intended to include all possible types of devices and mechanisms for outputting information from the device system 800. The output device(s) 814 may be used, for example, to present user interfaces to facilitate user interaction with applications performing processes described herein and variations therein, when such interaction may be appropriate. While a device 800 with user interface output devices is used for the purpose of illustration, it should be noted that the device 800 may operate without an output device, such as when the device 800 is operated in a server rack and, during typical operation, an output device is not needed.

The storage subsystem 806 may provide a computer-readable storage medium for storing the basic programming and data constructs that may provide the functionality of at least one embodiment of the present disclosure. The applications or components thereof (programs, code modules (i.e., programming modules), instructions) that, when executed by one or more processors, may provide the functionality of one or more embodiments of the present disclosure and may be stored in the storage subsystem 806. These application modules or instructions may be executed by the one or more processors 802. The storage subsystem 806 may additionally provide a repository for storing data used in accordance with the present disclosure. The storage subsystem 806 may comprise a memory subsystem 808 and a file/disk storage subsystem 810.

The cryptographic module 824, which may be a trusted platform module (TPM), includes a memory subsystem 830, including a main random access memory (RAM) 828 for storage of instructions and data during program execution and a read only memory (ROM) 826, in which fixed cryptographic information may be stored, such as a hardware secret stored securely within the device 800 so as to be non-exportable (i.e., inaccessible through any call to the cryptographic module 824). The cryptographic module 824, in some embodiments, operates wholly or partly in compliance with Trusted Computing Group's TPM Main Specification level 2, Version 1.2, Revision 116, TPM Main Specification level 2, Version 1.2, Revision 103, and/or ISO/IEC 11889, which are incorporated herein by reference. The device 800 may also store cryptographic keys in RAM 828 and/or processor registers for temporary cryptographic processing. The cryptographic information stored in memory may be used in combination with cryptographic information obtained via the network interface 816 and/or one or more of the user interface input devices 812. The one or more cryptographic processors may be used to perform cryptographic operations in the device and may include a random number generator, SHA-2 or other hash generator and an encryption-decryption-signature engine.

The one or more cryptographic processors may also be configured to perform one or more encryption/decryption algorithms in accordance with one or more cryptographic algorithms, such as public key and/or private key cryptographic algorithms. For example, as discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include, but are not limited to, the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one-way functions and include, but are not limited to, algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include, but are not limited to, those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure. Generally, one or more components of the cryptographic module 824 may be configured to collectively perform various operations used generating cryptographically verifiable information for authentication objects.

As noted above, in various embodiments of the present disclosure, hardware secrets are securely stored within the cryptographic module 824. In some embodiments, the cryptographic module is implemented as or may contain a physically unclonable function (PUF), which is a function implemented in physical hardware to use one or more hardware secrets that are based at least in part on physical characteristics of the PUF. As a result, any attempt to obtain a hardware secret may require physical intrusion into the PUF, and physical intrusion may alter the physical characteristics of the PUF, thereby destroying the hardware secret. Example PUFs that may be used include PUFs using explicitly-introduced randomness, optical PUFs, coating PUFs, PUFs using intrinsic randomness, delay PUFs, static random access memory (SRAM) PUFs, butterfly PUFs, bistable ring PUFs, magnetic PUFs, metal resistance PUFs, and/or other devices whose physical characteristics encode information usable as or for a hardware secret.

Figure 9:
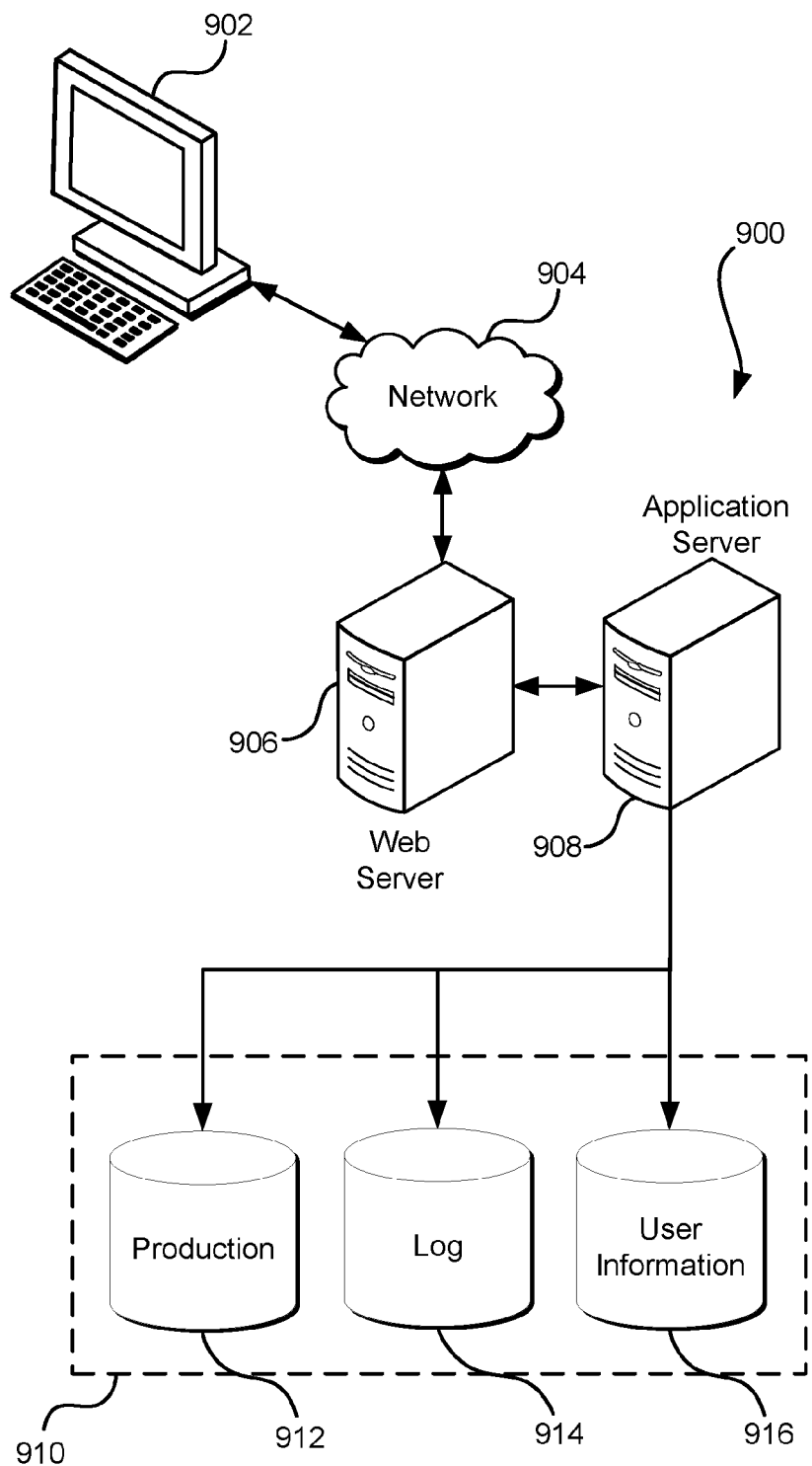
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser.

In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C,"

unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   initializing a set of virtual antenna interfaces configured to enable containers to access physical antenna resources, where the containers are supported by a virtualization layer executed by a mobile device;
   providing at least a portion of the set of virtual antenna interfaces to a first container;
   receiving a request from the first container through a first virtual antenna interface of the portion of the set of virtual interfaces provided to the first container;
   determining a priority associated with the request;
   placing the request in a first priority ring of a plurality of priority rings based at least in part on the determined priority, where the plurality of priority rings have a prioritization of the plurality of priority such that requests in a higher priority ring are selected for processing prior to requests in a lower priority ring based at least in part on the prioritization; and
   processing the request as a result of the priority ring being a highest priority ring with requests to be processed.

2. The computer-implemented method of claim 1, further comprising assigning a first share of access to physical antenna resources to the first priority ring, where the first share indicates an amount of time the physical antenna resources may be utilized to fulfill requests queued in the first priority ring.

3. The computer-implemented method of claim 1, wherein providing at least the portion of the set of virtual antenna interfaces to the first container further comprises exposing, by an agent executed by the mobile device, the portion of the set of virtual antenna interfaces such that the first container may provide requests to the portion of the set of virtual antenna interfaces.

4. The computer-implemented method of claim 3, further comprising assigning, by the agent, the priority to the first container.

5. A system, comprising:
   one or more processors; and
   a memory that includes instructions that, if executed by the one or more processors, cause the system to:
      initialize a virtual antenna interface associated with a physical antenna, where the virtual antenna interface is provided a virtualization layer that enables a container to utilize the physical antenna through the virtual antenna interface;
      expose the virtual antenna interface to the container;
      receive, at the virtual antenna interface, a request from the container, where the request includes priority information;
      determine a priority associated with the request based at least in part on the priority information;
      place the request in a highest priority ring of a plurality of priority rings having a prioritization of the plurality of priority rings where requests are selected to be processed based at least in part on the prioritization; and process the request according to the prioritization and the request having the highest priority according to the prioritization.

6. The system of claim 5, wherein the plurality of priority rings further comprises a lower priority ring and a lowest priority ring, where requests queued in the lower priority ring are processed after requests in the highest priority ring and requests queued in the lowest priority ring are processed after requests in the lower priority ring.

7. The system of claim 6, wherein the memory further includes instructions that, if executed by the one or more processors, cause the system to assign, by an agent executing at an operating system level, operating system requests to the highest priority ring.

8. The system of claim 6, wherein the memory further includes instructions that, if executed by the one or more processors, cause the system to assign, by an agent executing at an operating system level, user requests to the lower priority ring.

9. The system of claim 6, wherein the memory further includes instructions that, if executed by the one or more processors, cause the system to assign, by an agent executing at an operating system level, requests associated with test operations to a lowest level priority ring.

10. The system of claim 5, wherein initializing the virtual antenna interface further comprises initializing a single virtual antenna interface of a plurality of physical antennas of the system.

11. The system of claim 5, wherein initializing the virtual antenna interface further comprises initializing, for each physical antenna of the system, wherein the system further includes a plurality of physical antennas and at least a portion of the plurality of physical antennas are of different types, a single virtual antenna interface.

12. The system of claim 5, wherein initializing the virtual antenna interface further comprises loading into memory of the system a virtual device driver.

13. A non-transitory computer-readable storage medium having stored thereon executable instructions that, as a result of being executed by one or more processors of a computer system, cause the computer system to at least:

provide to a container a set of virtual antenna interfaces associated with a set of physical antennas, where each virtual antenna interface of the set of virtual antenna interfaces is provided by a virtualization layer that enables the container to access a particular physical antenna of the set of physical antennas through the virtual antenna interface;

receive, at a first virtual antenna interface corresponding to a first physical antenna, a request from the container;

determine a priority associated with the request based at least in part on information associated with the container; and process the request from a priority ring of a plurality of priority rings having a prioritization of the plurality of priority rings where requests are selected to be processed based at least in part on the prioritization and the priority ring for the request is determined based at least in part on the priority associated with the request.

14. The non-transitory computer-readable storage medium of claim 13, wherein the instructions that cause the computer system to determine the priority associated with the request further include instructions that cause the computer system to determine the priority associated with the request based at least in part on an application responsible for generating the request.

15. The non-transitory computer-readable storage medium of claim 13, wherein the instructions that cause the computer system to determine the priority associated with the request further include instructions that cause the computer system to determine the priority associated with the request based at least in part on one or more factors including the container associated with the request, one or more other requests dependent on the request, and a point in time at which the request was submitted.

16. The non-transitory computer-readable storage medium of claim 13, wherein the instructions further comprise instructions that, as a result of being executed by the one or more processors, cause the computer system to assign the priority to the container during initialization of the container.

17. The non-transitory computer-readable storage medium of claim 13, wherein the virtualization layer is a hypervisor.

18. The non-transitory computer-readable storage medium of claim 13, wherein the instructions that cause the computer system to receive the request from the container further include instructions that cause the computer system to receive the request from an agent executed by the container and running within a container namespace and control group.

19. The non-transitory computer-readable storage medium of claim 13, wherein the instructions that cause the computer system to determine the priority associated with the request further include instructions that cause the computer system to execute one or more functions of an agent that is a component of an operating system executed by the computer system.

20. The non-transitory computer-readable storage medium of claim 19, wherein the instructions that cause the computer system to determine the priority associated with the request further include instructions that cause the computer system to submit an application programming interface to the operating system to determine priority information associated with the request.

* * * * *